United States Patent [19]
Best

[11] 3,779,030
[45] Dec. 18, 1973

[54] METHOD OF MAKING SODIUM CHLORIDE CONCENTRATE FROM SEA WATER
[75] Inventor: John S. Best, Midland, Mich.
[73] Assignee: The Dow Chemical Company, Midland, Mich.
[22] Filed: Dec. 1, 1971
[21] Appl. No.: 203,730

[52] U.S. Cl. .................. 62/58, 23/298, 23/303, 252/70, 423/499
[51] Int. Cl. ............................................. B01d 9/04
[58] Field of Search .................. 62/58; 23/303, 298; 252/70; 423/499

[56] References Cited
UNITED STATES PATENTS

| | | | |
|---|---|---|---|
| 1,156,388 | 10/1915 | Bradburn | 23/298 |
| 1,286,932 | 12/1918 | Burnham | 23/298 |
| 1,415,203 | 5/1922 | Stevenson | 423/499 |
| 1,415,204 | 5/1922 | Stevenson | 423/499 |
| 1,790,436 | 1/1931 | Mumford | 23/298 |
| 1,861,957 | 6/1932 | Remer | 252/70 |
| 2,101,055 | 12/1937 | Field | 252/70 |
| 2,705,407 | 4/1955 | Colonna | 62/58 |
| 3,655,333 | 4/1972 | Stenger et al. | 23/303 |

*Primary Examiner*—Norman Yudkoff
*Assistant Examiner*—R. T. Foster
*Attorney*—William M. Yates et al.

[57] ABSTRACT

A continuous method of producing a sodium chloride concentrate from sea water which comprises initially seeding sea water with sodium chloride, cooling this admixture to approximately the eutectic temperature of the sodium chloride solution and separating the ice crystals that form from the residual sodium chloride concentrate; thereafter a portion of the remaining sodium chloride concentrate is added to fresh sea water, and the process is repeated. This continuous process thereby yields a sodium chloride concentrate and ice.

6 Claims, 1 Drawing Figure

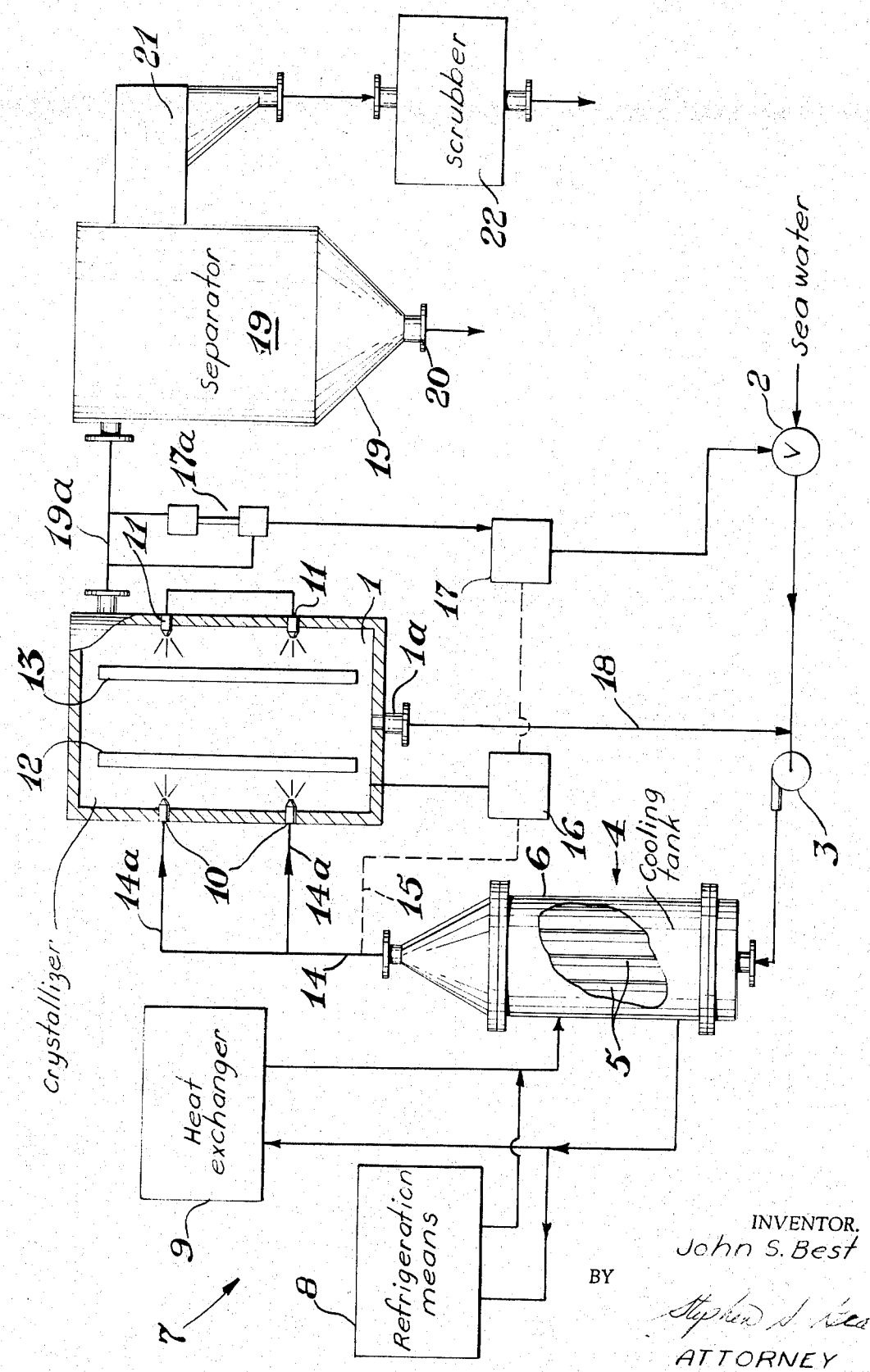

METHOD OF MAKING SODIUM CHLORIDE CONCENTRATE FROM SEA WATER

BACKGROUND OF THE INVENTION

This invention relates to a method of producing a sodium chloride concentrate from sea water. More particularly, it relates to such a method that is adaptable to the Arctic areas of the world, where the need for easily produced sodium chloride concentrates and fresh water is acute. The former product can be used as an additive to crude oil in Arctic pipelines to prevent freezing while the latter may be used as drinking water for people, such as oil well crews, stationed in the area.

It is, therefore, an object of the present invention to provide a continuous method for producing sodium chloride concentrates from sea water.

It is a further object of this invention to provide such a method that can be adapted to Arctic conditions.

It is a still further object of this invention to provide such a method that additionally provides a supply of fresh water as a second product.

SUMMARY OF THE INVENTION

The present invention arises from the discovery that the above-mentioned objects can be accomplished by a method which comprises:

a. adding sodium chloride to sea water to form an admixture having a concentration of sodium chloride within the range of from about 15 to about 25 weight per cent;

b. cooling the admixture to a temperature within the range of from about 0°F to about −8°F, whereby ice crystals are formed;

c. separating the ice crystals from the residual sodium chloride concentrate;

d. adding fresh sea water to the residual concentrate to form a second admixture having a sodium chloride concentration within the range of from about 15 to about 25 weight per cent; and e. recycling the second admixture through steps (b)-(e).

As used in the present specification and claims, the term "sodium chloride concentrate" denotes a solution in water of primarily sodium chloride; however other substances, such as those found in sea water, can be present.

In carrying out this invention, the method of cooling the admixture of sodium chloride and sea water is not critical. This can be done by contacting the admixture with cold, ambient temperature atmosphere. Alternatively, it could be accomplished by mechanical means or a heat exchanger, part of the heat exchanger being in contact with cold, ambient temperature atmosphere. Or, as in a preferred embodiment of this invention, both mechanical means and a heat exchanger could be employed as desired, depending upon ambient temperatures.

Further, while the eutectic temperature of sodium chloride solutions is −6°F and the eutectic composition of such solutions is 23.3 per cent sodium chloride by weight, this invention is not limited by these parameters. The solid sodium chloride that forms at temperatures below −6°F and at concentrations higher than 23.3 per cent can be carried with the ice crystals that are formed and be separated therefrom during further processing.

THE DRAWING

The FIGURE is a flow diagram of one preferred embodiment of the present invention.

PREFERRED EMBODIMENT

The following embodiment will illustrate the present invention and the manner by which it can be practiced but, as such, should not be construed as a limitation upon the over-all scope of the same.

Referring to the FIGURE, initially a sodium chloride solution having a concentration within the range of from about 15 to about 25 weight per cent is formed and put into the crystallizer tank 1. Thereafter a portion of this concentrated sodium chloride solution is added via line 18 to sea water from valve 2 to form an admixture having a sodium chloride concentration within the range of from about 15 to about 25 weight per cent. The concentrated sodium chloride solution critically added to the sea water could, if desired, be added from a source different from crystallizer tank 1.

The admixture is moved by pump 3 into a cooling tank 4, where it is cooled to a temperature of from about 0°F to about −8°F, without allowing ice crystals to form to the extent of solidifying the admixture in the cooling tank. This last condition can be accomplished by natural turbulence of the water being pumped into the cooling tank; or, if conditions dictate, an additive such as, for example, methyl cellulose, can be introduced into the admixture to further control the formation of ice crystals in the cooling tank. In this preferred embodiment, a tube and shell heat exchanger is employed as a cooling tank. The admixture is contained within the tubes 5 while it is cooled by a fluid in the shell 6 from a heat exchange system generally denoted by reference numeral 7. However, the instant invention is not so limited; any type of cooling tank that fulfills the purposes of the present invention would suffice.

The heat exchange system 7 in this embodiment consists of a mechanical refrigeration means 8 and a heat exchanger 9. However, as noted previously, a particulate method of cooling is not critical as long as it fulfills the requirements of this invention.

The cooled admixture is next added to the crystallizer tank 1 through lines 14 and 14a, while simultaneously agitating and monitoring the temperature and specific gravity of the cooled admixture in the crystallizer tank 1, thereby producing finely divided ice crystals and a residual sodium chloride concentrate increasingly concentrated in sodium chloride.

The agitation can be accomplished by mechanical means, or as in this embodiment, by using nozzles 10 and 11 connected to lines 14a in conjunction with baffles 12 and 13. The admixture is added through the nozzles 10 and 11 and the streams are deflected by the baffles 12 and 13, thereby producing agitation which keeps the ice crystals from agglomerating. This method is preferred because the agitation is accomplished without resort to separate mechanical means, but this invention is not so limited.

Thermocouple line 15 is provided with a temperature controller 16 and a specific gravity controller 17. This, in conjunction with float detector 17a connected to line 19a, allows a continual, simultaneous monitoring of the concentrate coming from the crystallizer 1 to the separator 19.

Any means of monitoring these parameters, however, would suffice.

At a specific gravity of from about 93 to about 125 pounds per cubic foot a portion of the residual sodium chloride concentrate formed in the crystallizer tank 1 is added to the fresh sea water via line 18 to form a second admixture having a sodium chloride concentration within the range of from about 15 to about 25 weight per cent.

This second admixture is then added to the cooling tank 4 whereby, by volume displacement, the admixture then in the cooling tank is removed therefrom. This cooling tank admixture then is added to the crystallizer tank 1 whereby, by volume displacement, finely divided ice crystals and some of the residual sodium chloride concentrate are removed from the crystallizer tank 1.

The second admixture (now in the cooling tank 4) is then recycled by cooling it, adding it to the crystallizer tank 1, adding some of the residual sodium chloride concentrate to fresh sea water and pumping this admixture into the cooling tank 4 to create the above-mentioned volume displacements whereby more ice crystals and more residual sodium chloride concentrate are removed from the crystallizer tank 4. In such a way a continuous process is obtained.

When the finely divided ice crystals and residual sodium chloride concentrate are removed from the crystallizer tank 1 by volume displacement through line 19a they go to a separator tank 19. Here the finely divided ice crystals are directed into part 21 of tank 19 while the concentrate separates out via port 20. As an optional step the ice crystals (which may contain some salt) are purified by a cleansing apparatus 22, such as a scrubber.

The present invention is not limited to any particular mode of separation as long as it fulfills the basic purposes of this invention.

What is claimed is:

1. A continuous method of making a sodium chloride concentrate from sea water which comprises:
   a. adding sodium chloride to sea water to form an admixture having a concentration of sodium chloride within the range of from about 15 to about 25 weight per cent;
   b. cooling the admixture to a temperature within the range of from about 0°F to about −8°F, whereby ice crystals and a residual sodium chloride concentrate are formed;
   c. separating and recovering the ice crystals from the residual sodium chloride concentrate;
   d. adding a sufficient quantity of the residual concentrate to additional sea water to form a second admixture having a sodium chloride concentration within the range of from about 15 to about 25 weight per cent; and
   e. recycling the second admixture through steps (b)–(e).

2. A method as in claim 1 wherein the admixture is cooled by contact with cold, ambient temperature atmosphere.

3. A method as in claim 1 wherein the admixture is cooled by a combination of mechanical refrigeration means and a heat exchanger, part of said heat exchanger being in contact with cold, ambient temperature atmosphere.

4. A continuous method of making a sodium chloride concentrate from sea water which comprises:
   a. forming a sodium chloride solution having a concentration within the range of from about 15 to about 25 weight per cent;
   b. adding a portion of the concentrated sodium chloride solution to sea water to form an admixture having a sodium chloride concentration within the range of from about 15 to about 25 weight per cent;
   c. cooling the admixture in a cooling tank to a temperature within the range of from about 0°F to about −8°F, without allowing ice crystals to form to the extent of solidifying the admixture in the cooling tank;
   d. adding the cooled admixture to a crystallizer tank while simultaneously agitating and monitoring the temperature and specific gravity of the cooled admixture in the crystallizer tank, thereby producing finely divided ice crystals and a residual sodium chloride concentrate increasingly concentrated in sodium chloride;
   e. at a specific gravity of about 93 to about 125 pounds per cubic foot, removing a portion of the residual sodium chloride concentrate from the crystallizer tank and adding it to fresh sea water to form a second admixture having a sodium chloride concentration within the range of from about 15 to about 25 weight per cent;
   f. adding the second admixture to the cooling tank whereby, by volume displacement, the admixture then in the cooling tank is removed therefrom;
   g. adding the cooling tank admixture to the crystallizer tank, whereby, by volume displacement, finely divided ice crystals and some of the residual sodium chloride concentrate are removed from the crystallizer tank;
   h. recycling the second admixture through steps (c)–(h); and
   i. separating the finely divided ice crystals from the residual sodium chloride concentrate.

5. A method as in claim 4 wherein the admixture is cooled by contact with cold, ambient temperature atmosphere.

6. A method as in claim 4 wherein the admixture is cooled by a combination of mechanical means and a heat exchanger, part of said heat exchanger being in contact with cold, ambient temperature atmospehre.

* * * * *